(12) United States Patent
Yamagiwa et al.

(10) Patent No.: US 7,316,253 B2
(45) Date of Patent: Jan. 8, 2008

(54) SEALANT FOR PREVENTION OF BLOWOUT, TUBELESS TIRE, AND TIRE TUBE

(75) Inventors: Toshio Yamagiwa, Saitama (JP); Akiko Tanaka, Saitama (JP); Akira Tanaka, Saitama (JP); Ken Fujiwara, Saitama (JP); Noriyuki Deguchi, Saitama (JP); Kentaro Yamashita, Saitama (JP)

(73) Assignees: Honda Giken Kogyo Kabushiki Kaisha, Tokyo (JP); Nippon Leakless Kogyo Kabushiki Kaisha, Tokyo (JP)

( * ) Notice: Subject to any disclaimer, the term of this patent is extended or adjusted under 35 U.S.C. 154(b) by 242 days.

(21) Appl. No.: 10/239,872

(22) PCT Filed: Mar. 29, 2001

(86) PCT No.: PCT/JP01/02664

§ 371 (c)(1),
(2), (4) Date: Jul. 9, 2003

(87) PCT Pub. No.: WO01/77251

PCT Pub. Date: Oct. 18, 2001

(65) Prior Publication Data

US 2004/0089386 A1 May 13, 2004

(30) Foreign Application Priority Data

Apr. 5, 2000 (JP) ............................. 2000-108019

(51) Int. Cl.
*C09K 3/12* (2006.01)
*B60C 19/12* (2006.01)
*B29C 73/16* (2006.01)

(52) U.S. Cl. ..................... 152/504; 106/33; 152/503; 152/506

(58) Field of Classification Search ........ 152/502–507; 523/166; 106/33
See application file for complete search history.

(56) References Cited

U.S. PATENT DOCUMENTS 3,903,947 A * 9/1975 Emerson ..................... 152/504

(Continued)

FOREIGN PATENT DOCUMENTS

CN 1231233 A 9/1999

(Continued)

*Primary Examiner*—Geoffrey L. Knable
(74) *Attorney, Agent, or Firm*—Arent Fox LLP

(57) ABSTRACT

The viscosity of a puncture-preventing sealant (7) is set in a range of 25 to 35 dPa·s, and a thixotropy index is set in a range of 6.5 to 11.0, the sealant (7) being filled in a sealant chamber (6) defined to extend along an outer periphery of an air chamber (5) in a tire (T). When the tire (T) is being rotated by traveling of a vehicle, the viscosity of the sealant (7) is reduced by a stirring action provided by a vibration or a centrifugal force of the sealant (7), whereby the sealant (7) can be diffused uniformly in the sealant chamber (6). When the vehicle has been stopped and the stirring action has been extinguished, the viscosity of the sealant (7) is increased, whereby the sealant (7) is maintained in a state in which it has been diffused uniformly in the sealant chamber (6) without flowing downwards in the sealant chamber (6) by gravitation. Therefore, even when the vehicle is travelling at a high speed, the generation of a vibration and a noise can be prevented. In this manner, the puncture-preventing sealant is provided, which has such a nature that the sealant is easy to flow due to a low viscosity during traveling of a vehicle, and the sealant is difficult to flow due to a high viscosity when the sealant is left to stand.

3 Claims, 3 Drawing Sheets

U.S. PATENT DOCUMENTS

| | | | |
|---|---|---|---|
| 4,116,895 A | 9/1978 | Kageyama et al. | |
| 4,665,963 A | 5/1987 | Timar et al. | |
| 5,772,747 A * | 6/1998 | Turner et al. | 106/33 |
| 5,785,749 A * | 7/1998 | Knesek et al. | 106/484 |
| 6,013,697 A * | 1/2000 | True et al. | 523/166 |
| 6,264,732 B1* | 7/2001 | Tanaka et al. | 106/33 |
| 6,709,896 B1* | 3/2004 | Cobbley et al. | 438/118 |
| 6,786,990 B1* | 9/2004 | Yamagiwa | 156/115 |
| 2002/0077391 A1* | 6/2002 | McInnes | 524/13 |

FOREIGN PATENT DOCUMENTS

| | | |
|---|---|---|
| DE | 39 32 278 A1 | 4/1991 |
| EP | 0 798 140 A2 | 10/1997 |
| EP | 940270 A2 * | 9/1999 |
| JP | 54-8307 | 1/1979 |
| JP | 57-63374 | 4/1982 |
| JP | 10-17851 | 1/1998 |
| JP | 10-71806 | 3/1998 |
| JP | 2000-104042 | 4/2000 |
| WO | WO 96/05048 | 2/1996 |

* cited by examiner

SEALANT FOR PREVENTION OF BLOWOUT, TUBELESS TIRE, AND TIRE TUBE

FIELD OF THE INVENTION

The present invention relates to a puncture-preventing sealant which is filled in a sealant chamber defined to extend along an outer periphery of an air chamber in a tire, as well as to a tubeless tire and a tire tube using such puncture-preventing sealant.

BACKGROUND ART

A tire using such a puncture-preventing sealant is already known from Japanese Patent Application Laid-open No. 10-71806, for example. The known puncture-preventing sealant has a viscosity set in a range of 20 to 23 dPa·s, and a thixotropy index set in a range of 5.5 to 5.8.

When a vehicle provided with a tire assembly comprising a tire using the above known puncture-preventing sealant and assembled to a wheel is traveling at a high speed exceeding 100 km/hr, for example, a vibration and/or a noise may be produced due to an unbalance of the tire assembly in some cases. Such unbalance can be overcome by the correction using a balance weight. However, when the viscosity of the sealant is low, the following problem is encountered: If the vehicle is left in a stopped state, the sealant flows to a lower portion of the sealant chamber by gravitation, whereby the tire assembly is brought again into its unbalanced state. Another problem is that even if a static balance is provided in a tire assembly comprising a tire assembled to a wheel, as commonly conducted, the sealant is moved within the sealant chamber once the vehicle travels, resulting in the balance loss again. If the viscosity of the sealant is merely increased, the following problem is encountered: It is difficult to diffuse the sealant uniformly within the sealant chamber due to the rotation of the tire caused by traveling of the vehicle, and an appropriate sealability is not provided.

Therefore, the development of a sealant has been desired, which is permitted to flow within the sealant chamber to become diffused uniformly in a traveling state of a vehicle, and is difficult to flow within the sealant chamber in a left state, whereby the balance can be prevented from being lost.

DISCLOSURE OF THE INVENTION

The present invention has been accomplished in view of the circumstances described above, and it is an object of the present invention to ensure that the puncture-preventing sealant has such a nature that the sealant is easy to flow due to a low viscosity during traveling of a vehicle, and is difficult to flow due to a high viscosity when it is left to stand, while ensuring that the puncture-preventing sealant has a sealability equivalent to that of the known sealant, whereby the balanceability can be enhanced.

To achieve the above object, according to a first aspect and feature of the present invention, there is proposed a puncture-preventing sealant which is filled in a sealant chamber defined to extend along an outer periphery of an air chamber in a tire, the sealant having a viscosity in a range of 25 to 35 dPa·s, and a thixotropy index in a range of 6.5 to 11.0.

With the above feature, the viscosity of the puncture-preventing sealant is in the range of 25 to 35 dPa·s, and the thixotropy index of the sealant is in the range of 6.5 to 11.0. Therefore, when the tire is being rotated by traveling of a vehicle, the viscosity of the sealant is reduced by a stirring action caused by a vibration or a centrifugal force, whereby the sealant can be diffused uniformly within the sealant chamber. When the vehicle has been stopped, resulting in the elimination of stirring action, the viscosity of the sealant is increased, whereby the sealant is maintained in a state in which it has been diffused uniformly without flowing downwards within the sealant chamber by gravitation. Therefore, a balanced state can be maintained, and even when the vehicle travels at a high speed after lapse of a long time in the stopped state of the vehicle, the generation of a vibration and a noise can be prevented.

Further, there is proposed a tubeless tire using a puncture-preventing sealant described above, the sealant chamber having a radial thickness in a range of 1.2±0.3 mm.

With th above feature, the radial thickness of the sealant chamber is set in the range of 1.2±0.3 mm. Therefore, it is possible to prevent the thickness from being too large, causing the sealant to flow downwards under the action of the force of gravity, resulting in the balance loss, when the tire is left to stand, and to prevent the thickness from being too small, causing the sealability for a puncture to be reduced, or to prevent the sealant from being difficult to diffuse uniformly within the sealant chamber. Thus, both of the balanceability and the sealability of the tire can be reconciled to the maximum.

Further, there is proposed a tire tube using a puncture-preventing sealant described above, the sealant chamber having a radial thickness in a range of 1.2±0.3 mm.

With the above feature, the radial thickness of the sealant chamber is in the range of 1.2±0.3 mm. Therefore, it is possible to prevent the thickness from being too large, causing the sealant to flow downwards by gravitation, resulting in the balance loss, when the tire is left to stand, and to prevent the thickness from being too small, causing the sealability for a puncture to be reduced, or to prevent the sealant from being difficult to diffuse uniformly within the sealant chamber. Thus, both of the balanceability and the sealability of the tire can be reconciled to the maximum.

The above and other objects, features and advantages of the invention will become apparent from the following description of the preferred embodiments taken in conjunction with the accompanying drawings.

BRIEF DESCRIPTION OF THE DRAWINGS

FIGS. 1 to 3 show embodiments of the present invention, wherein FIG. 1 is a cross-sectional view of a wheel having a tubeless tire mounted thereon; FIG. 2 is a cross-sectional view of a wheel having a tube-incorporated tire mounted thereon; and FIG. 3 is a graph showing a characteristic of variation in viscosity with respect to the number of days on which a sealant has been left to stand.

BEST MODE FOR CARRYING OUT THE INVENTION

The present invention will now be described by way of embodiments with reference to the accompanying drawings.

Figure 1:
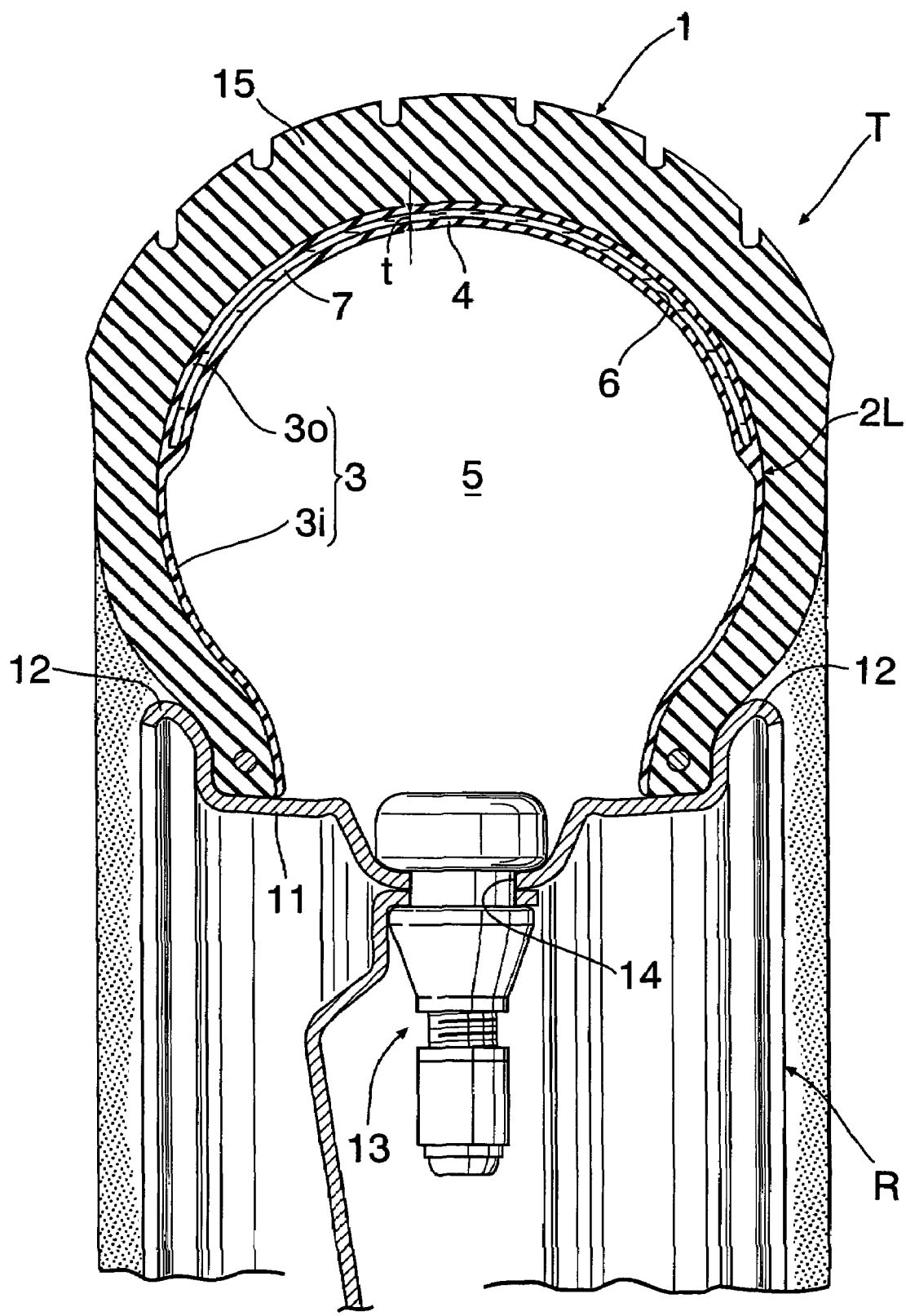

FIG. 1 shows an embodiment in which a sealant according to the present invention is utilized in a tubeless tire T. The tubeless tire T is mounted on a rim R of a wheel, and comprises a tire body 1 and an inner liner 2L adhered by vulcanization to the inside of the tire body 1. The inner liner 2L includes a peripheral wall 3, which is formed into a U-shape in section and has air-chamber peripheral wall portions 3i, 3i located on the radially inner side of the tire T, and a sealant-chamber peripheral wall portion 3o located on the radially outer side of the tire T. Connections between the air-chamber peripheral wall portions 3i, 3i and the sealant-chamber peripheral wall portion 3o of the peripheral wall 3 are connected to each other by a partition wall 4 formed integrally with the peripheral wall 3. Air is filled in an air chamber 5 substantially circular in section and defined between the air-chamber peripheral wall portions 3i, 3i and the partition wall 4, and a gelled sealant 7 is filled in a sealant chamber 6 substantially arcuate in section and defined between the sealant-chamber peripheral wall portion 3o and the partition wall 4.

The rim R includes an annular rim body 11 extending circumferentially of the tire T, and a pair of flange portions 12, 12 extending radially outwards from widthwise opposite ends of the rim body 11 to retain an inner periphery of the tire body 1. A pneumatic valve 13 for filling air into the air chamber 5 defined inside the inner liner 2L is supported to extend through a pneumatic valve-mounting portion 14 formed at circumferentially one point on the rim body 11.

Figure 2:
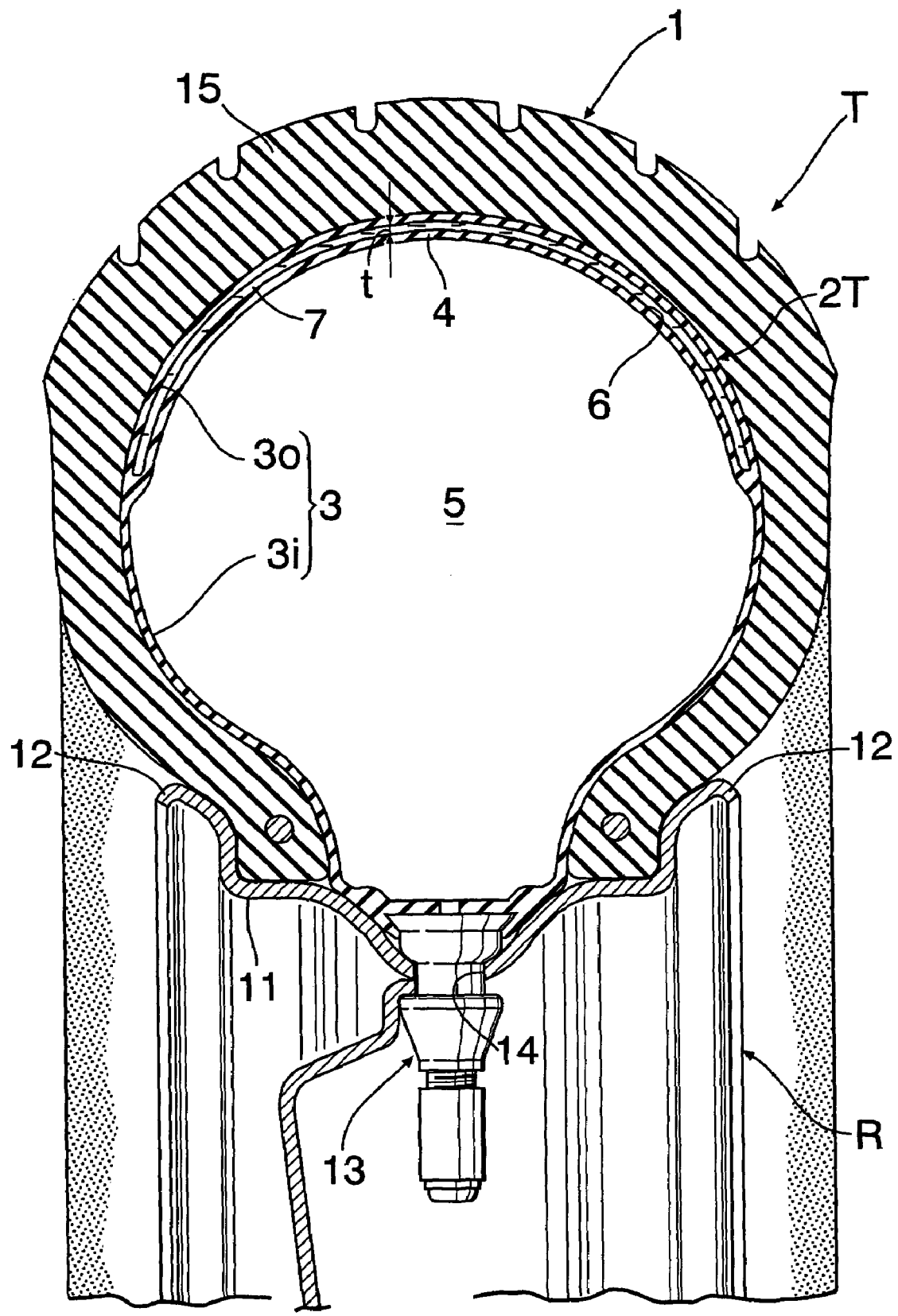

FIG. 2 shows an embodiment in which a sealant 7 according to the present invention is utilized in a tube-incorporated tire T. The tube-incorporated tire T includes a tire tube 2T corresponding to the inner liner 2L of the above-described tubeless tire T. The tire tube 2T is capable of being mounted and removed on and from the tire body 1, and includes air-chamber peripheral wall portions 3i, a sealant-chamber peripheral wall portion 3o and a partition wall 4, as does the inner liner 2L. An air chamber 5 is defined between the air-chamber peripheral wall portions 3i and the partition wall 4, so that air is filled in the air chamber 5, and a sealant chamber 6 is defined between the sealant-chamber peripheral wall portion 3o and the partition wall 4, so that a sealant 7 is filled in the sealant chamber 6. A pneumatic valve 13 is mounted in the air-chamber peripheral wall portions 3i of the tire tube 2T and supported to extend through a pneumatic valve-mounting portion 14 formed at circumferentially one point on the rim body 11.

Thus, the sealant chamber 6 in the inner liner 2L or the tire tube 2T is maintained in a shape extending along the inside of a tread 15 by an air pressure in the air chamber 5. Therefore, even if the tire body 1 is punctured radially or sideways by a nail or the like, the sealant 7 fills the puncture immediately to repair it, thereby retarding the leakage of the air from the air chamber 5. The sealant 7 is retained in the sealant chamber 6 and cannot flow out of the sealant chamber 6 into the air chamber 5, and hence, the pneumatic valve 13, a pressure gauge applied to the pneumatic valve 13 and the like cannot be clogged.

The sealant 7 filled in the sealant chamber 6 will be described below.

When the tire T is being rotated by traveling of a vehicle, the viscosity of the sealant 7 in the present embodiment is reduced by a stirring action provided by a vibration transmitted from a road surface or by a centrifugal force of the sealant 7, whereby the sealant 7 can be diffused uniformly in the annular sealant chamber 6 to provide a static balance and a dynamic balance for wheels. When the vehicle has been stopped and left in a state in which the stirring action has been extinguished, the viscosity of the sealant 7 is increased, whereby the sealant 7 is maintained in a state in which it has been diffused uniformly in the sealant chamber 6 without flowing downwards in the sealant chamber 6 by gravitation. Therefore, when the vehicle is traveling at a high speed, the same state as in the balancing can be reproduced.

TABLE 1

| Constituent | % By weight |
| --- | --- |
| Water | 65 |
| Propylene glycol | 30 |
| Thickener | 2.0 |
| Nylon fiber | 0.5 |
| Cotton fiber | 1.4 |
| Ceramic powder | 0.5 |
| Dye | 0.1 |

As shown in Table 1, constituents of the sealant 7 in the present embodiment are 65% by weight of water, 30% by weight of propylene glycol, 2.0% by weight of a thickener, 0.5% by weight of a nylon fiber, 1.4% by weight of a cotton fiber, 0.5% by weight of a ceramic powder, and 0.1% by weight of a dye.

TABLE 2

| | Prior art | Embodiment |
| --- | --- | --- |
| Viscosity | 23 | 30 |
| Thixotropy index | 5.8 | 7.02 |
| Balanceability | X | ○ |
| Sealability for puncture | Δ-○ | ○ |

As shown in Table 2, the prior art sealant has a viscosity of 23 dPa·s and a thixotropy index of 5.8, while the sealant 7 in the present embodiment has a viscosity of 30 dPa·s and a thixotropy index of 7.02. The thixotropy index is a value determined according to JIS K5400, and the viscosity is a value measured by a VT-04 type viscometer made by RION. The sealant 7 in the present embodiment has the thixotropy index larger than that of the prior art sealant and hence, shows a remarked tendency to reduce in viscosity during traveling of the vehicle and to increase in viscosity when the sealant is being left to stand. The puncture sealability of the sealant 7 in the present embodiment is also superior to that of the prior art sealant due to the constituent of the sealant 7 shown in Table 1.

Figure 3:
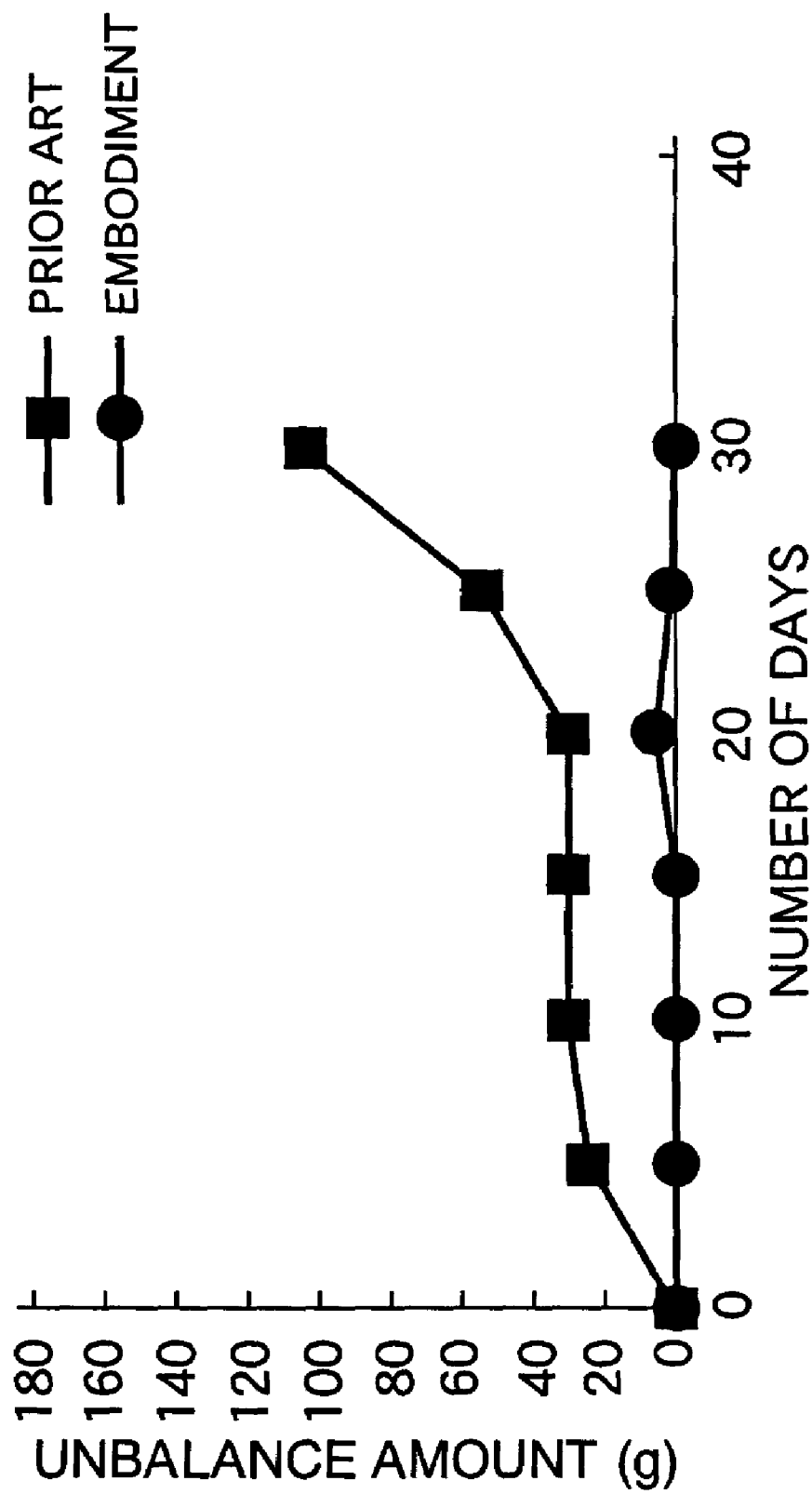

As shown in a graph in FIG. 3, in a tire using the prior art sealant having the lower thixotropy index, the unbalance amount is varied with an increase in number of days on which the sealant has been left to stand after traveling of the vehicle, but in the tire T using the sealant 7 in the present embodiment having the higher thixotropy index, the unbalance amount is maintained stably, even if the number of days on which the sealant has been left to stand after traveling of the vehicle is increased.

In the tire T in each of the embodiments shown in FIGS. 1 and 2, the sealant chamber 6 has a radial thickness t set in a range of 1.2±0.3 mm and thus, it is possible to exhibit the balanceability and the puncture sealability of the tire T to the maximum.

Although the embodiments of the present invention have been described in detail, it will be understood that the present invention is not limited to the above-described embodiments, and various modifications in design may be made without departing from the spirit and scope of the invention defined in claims.

For example, in the embodiments, the viscosity of the sealant 7 is 30 dPa·s, and the thixotropy index is 7.02, but if the viscosity is set in a range of 25 to 35 dPa·s, and the thixotropy index is in a range of 6.5 to 11.0, a desired effect can be provided.

What is claimed is:

1. A puncture-preventing sealant comprising 65% by weight of water, 30% by weight of propylene glycol, 2.0% by weight of a thickener, 0.5% by weight of a nylon fiber, 1.4% by weight of a cotton fiber, 0.5% by weight of a ceramic powder, and 0.1% by weight of a dye.

2. A tubeless tire comprising a puncture-preventing sealant according to claim 1 filled in a sealant chamber defined to extend along an outer periphery of an air chamber in the tire, wherein said sealant chamber has a radial thickness in a range of 1.2±0.3 mm.

3. A tire tube comprising a puncture-preventing sealant according to claim 1 filled in a sealant chamber defined to extend along an outer periphery of an air chamber in the tire tube, said sealant chamber having a radial thickness in a range of 1.2±0.3 mm.

* * * * *